United States Patent [19]

Wessling et al.

[11] 4,002,586
[45] Jan. 11, 1977

[54] METHOD FOR PREPARING CATIONIC LATEXES

[75] Inventors: Ritchie A. Wessling; Thomas C. Klingler; Victor E. Meyer, all of Midland, Mich.

[73] Assignee: The Dow Chemical Company, Midland, Mich.

[22] Filed: Apr. 21, 1975

[21] Appl. No.: 569,720

[52] U.S. Cl. .................. 260/29.2 EP; 260/29.6 T; 260/29.6 SQ; 260/29.6 MQ; 260/29.6 TA; 260/29.7 H; 260/29.7 SQ; 260/29.7 T
[51] Int. Cl.$^2$ ......................................... C08L 63/00
[58] Field of Search ............. 260/29.2 EP, 29.6 T, 260/29.6 SQ, 29.6 MQ, 29.6 TA, 29.7 H, 29.7 SQ, 29.7 T, 879

[56] References Cited

UNITED STATES PATENTS

| | | | |
|---|---|---|---|
| 3,236,820 | 2/1966 | Lloyd | 260/79.3 |
| 3,562,354 | 2/1971 | Golstein | 260/884 |
| 3,637,432 | 1/1972 | Gibbs et al. | 260/29.6 TA |
| 3,660,525 | 5/1972 | Kawahara | 260/884 |
| 3,745,196 | 7/1973 | Lane et al. | 260/884 |
| 3,793,278 | 2/1974 | DeBona | 260/29.2 EP |
| 3,936,405 | 2/1976 | Sturni et al. | 260/29.6 T |

Primary Examiner—M. J. Welsh
Attorney, Agent, or Firm—I. A. Murphy

[57] ABSTRACT

Modified cationic latexes are prepared from nonionic or cationic latexes having particles containing chemically bound epoxide groups at or near the particle surface by reacting the latex with a nucleophile such as dimethyl sulfide and an acid such as acetic acid to form a latex having stabilizing onium ions chemically bound to the particle at or near the particle surface.

10 Claims, No Drawings

METHOD FOR PREPARING CATIONIC LATEXES

BACKGROUND OF THE INVENTION

1. Field of the Invention

The invention is concerned with a method for the preparation of stable, cationic latex compositions. The polymer particles comprising the latex have stabilizing, sulfonium cations chemically bound at or near the surface of the particles.

2. Description of the Prior Art

Latexes require some means for providing colloidal stabilization in aqueous media. The usual colloidal stabilization is provided by surfactants which usually are anionic or cationic but may be non-ionic, especially in mixtures with anionic or cationic surfactants. Even though they contribute to the required colloidal stability, the surfactants can interfere with coating performance of the latexes although the amount is limited and less than the desired stability is obtained. Another method is to copolymerize with non-ionic monomers a a small proportion of an ionic monomer to prepare a stable latex with little or no conventional surfactant as described in U.S. Pat. No. 3,637,432. Such processes, however, require special combinations of monomers and special polymerization techniques. Although such processes produce latexes having little or no surfactants, varying amounts of water-soluble products are made during carrying out of the process and remain in the product.

U.S. Pat. No. 3,793,278 describes the reaction of epoxy resins with sulfides and acids, generally in solution to form cationic resins which are then dissolved in water as clear or colloidal solutions. The process is directed to the conversion of relatively low molecular weight resins. Reactions with high molecular weight resins are more difficult because of problems with incompatibility and high viscosity. It would be desirable if a method were available to convert high molecular weight polymers to particles in the form of cationic latexes having cationic charges chemically bound to the particles at or near the particle surface without at the same time forming water-soluble polymeric materials.

SUMMARY OF THE INVENTION

This invention involves a latex having structured particles consisting of a water-insoluble, nonionic, organic polymer core encapsulated with a thin layer of a polymer having chemically-bond, pH independent cationic groups, said structured particles having bound cationic charges at or near the outer surface of the particles. Such latexes may be obtained by polymerizing under emulsion polymerization conditions an ethylenically unsaturated epoxide monomer onto the particle surface of a latex of a non-ionic, organic polymer which is slightly cationic through the presence of adsorbed cationic surfactant. The latexes are reacted with a nonionic nucleophile and an acid to form latexes having structured particles consisting of a water-insoluble, nonionic, organic polymer core encapsulated with a layer of a polymer having pH independent, cationic groups chemically-bound at or near the outer surface of the structured-particle, the amount of said groups being sufficient to provide a major portion of the colloidal stability but insufficient to make the polymer water-soluble. The products are useful for coatings on various substrates and can be applied by various known methods, especially by electrodeposition onto conductive materials.

DESCRIPTION OF THE PREFERRED EMBODIMENTS

In one embodiment, the preparation of the products of the present invention requires a starting latex comprising solid polymer particles colloidally dispersed in water, the composition and method of preparation of which are known per se, but which is subsequently modified so that the particles of the starting latex are encapsulated with a copolymer of an ethylenically unsaturated epoxide monomer with a hydrophobic, ethylenically unsaturated monomer which is devoid of an epoxide. The resulting latex comprises colloidally dispersed particles having reactive epoxide groups on or near the surface of the particles. Such a latex can then be reacted with a low molecular weight, non-ionic, nucleophilic compound and an acid to form a latex having particles of polymer with pH independent cationic groups chemically bound to the particle surface. The colloidal stability of the latex is thereby enhanced and other advantageous properties are obtained.

There are many known latexes which may serve as the starting latex to prepare epoxide containing latexes and the composition is not narrowly critical. Such latexes are prepared by processes well known in the art. Preformed latexes having substantially no residual monomers may be used but advantageously these starting latexes can be prepared by emulsion polymerization as the first step in the preparation of latex products wherein some monomer and some free-radicals remain at the time of addition of the epoxide monomer. The starting latex, or components and methods for making such latex, are selected from the known latex compositions which are substantially devoid of anionic groups and/or anionic surfactants adsorbed or otherwise attached to the polymer particles comprising the latex. Preferably the latex is slightly cationic, usually from the presence of a small amount of a cationic surfactant. For best results the starting latex should not contain an amount of a surfactant sufficient to initiate new particles when additional monomer is introduced. The composition of the polymeric component of the starting latex also does affect certain properties of the final product since it constitutes a major portion of the total mass of the product. Thus, a selection will be made somewhat according to the desired polymeric properties known to be possessed by these prior art materials to supplement the properties which are attributable to the encapsulating component of the invention. Thus, as an illustration but not a limitation, for the predominant portion of the products, a starting latex which is film-forming at room temperature will be selected but there are uses for which a non-film forming starting latex would be selected, such as for plastic pigments. Ordinarily the starting latexes have a particle size of from about 500 to about 10,000 Angstroms, preferably from about 800 to about 3000 Angstroms. If the products are to be used in a manner such as to require certain commonly recognized characteristics, for example, low electrolyte concentration, such characteristics will be considered when selecting the starting latex and the ingredients to be used in carrying out subsequent parts of the process. Such selections are within the skill of the art and are not considered inventive aspects of the novel compositions and method herein described.

The starting latexes are obtained by emulsion polymerization of one or more monomers. Such monomers are represented by the same monomers listed below as suitable for copolymerization with the ethylenically unsaturated, epoxide monomers.

The starting latexes for encapsulation also may consist essentially of polymers which are not prepared readily from monomers by emulsion polymerization, either because no substantial polymerization at a commercially acceptable rate is obtained under usual emulsion polymerization conditions, such as with isobutene, or because a particular form of the polymerized monomer is desired, for example stereospecific polyisoprene, stereospecific polybutadiene and the like. Representative pre-formed polymers are polymers and copolymers of the mono-olefins having from 2 to 20 carbon atoms such as ethylene, propylene, 1-butene, 2-butene, isobutene, pentene, hexene, octene, dodecene, hexadecene, octadecene, and especially those mono-olefins having up to 8 carbon atoms. Especially common types are the various ethylene/propylene copolymers.

Illustrative of still other polymers which may be constituents for the starting latex for encapsulation are alkyd resins, block and graft copolymers; e.g., styrene/butadiene graft and block copolymers; epoxy resins such as the reaction products of epichlorohydrin and bisphenol-A; and thermosettable vinyl ester resins; e.g., the reaction products of approximately equimolar amounts of a polyepoxide and an unsaturated monocarboxylic acid such as acrylic acid and methacrylic acid or unsaturated fatty acids such as oleic acid.

Methods for preparing the above described polymers and methods for converting the polymers to latexes are well known and are not a part of this invention.

In one method for obtaining a latex which is suitable for subsequent reaction according to the method of this invention, the particles of a starting latex are encapsulated with a thin layer of a polymer of an ethylenically unsaturated epoxide monomer by adding the epoxide monomer or a mixture of such monomers to the reaction mixture of the starting latex before all of the monomers are converted to polymer or by adding the epoxide monomer, preferably together with one or more hydrophobic monomers, to the starting latex containing essentially no residual monomers, and initiating and continuing polymerization of the thus-added monomers to substantially complete conversion. Other latexes suitable for reaction according to the method of invention may be obtained by direct emulsion polymerization of an ethylenically unsaturated epoxide monomer and an ethylenically unsaturated, nonionic monomer which is devoid of an epoxide group. Latexes containing particles of copolymer having epoxide groups uniformly or randomly distributed throughout the particles are thereby obtained.

The epoxide monomers should be sufficiently activated to react at a reasonable rate after polymerization with subsequently added nucleophilic agents and acids but should not be so reactive as to hydrolyze readily in an aqueous medium. Such suitable monomers are represented by ethylenically unsaturated styrene oxides, the vinylbenzyl glycidyl ethers and the ethylenically unsaturated glycidyl esters. Specific preferred epoxide monomers are glycidyl acrylate and glycidyl methacrylate.

The ethylenically unsaturated epoxide monomers are oil soluble, are easy to polymerize in emulsion, do not inhibit free radical polymerization and diffuse at a satisfactory rate through the aqueous medium of a latex to the latex particle.

The hydrophobic, ethylenically unsaturated monomer which may be copolymerized with the epoxide monomer may be selected from the known wide variety of non-ionic, ethylenically unsaturated monomers which are polymerizable in aqueous emulsion to form a water-insoluble polymer and which do not react rapidly with the epoxide group. These monomers are well-known in the art and hence are illustrated below only by representative examples. The non-ionic, ethylenically unsaturated monomers are represented by, but not restricted to, hydrocarbon monomers such as the styrene compounds, e.g., styrene α-methylstyrene, ar-methylstyrene, ar-ethylstyrene α,ar-dimethylstyrene, ar,ar-dimethylstyrene, and t-butylstyrene; the conjugated dienes, e.g., butadiene and isoprene; the hydrocarbon monomers which are modified to possess nonionic substituents, e.g., methoxystyrene, and cyanostyrene; the unsaturated alcohol esters such as vinyl acetate and vinyl propionate; the unsaturated ketones, e.g., vinyl methyl ketone and methyl isopropenyl ketone; the unsaturated ethers, e.g., vinylethyl ether and vinyl methyl ether; and the non-ionic derivatives of ethylenically unsaturated carboxylic acids such as acrylic esters, e.g., methyl acrylate, ethyl acrylate, butyl acrylate, hexyl acrylate, 2-ethylhexyl acrylate and lauryl acrylate; methacrylic esters, e.g., methyl methacrylate, ethyl methacrylate; the maleic esters such as dimethyl maleate, diethyl maleate and dibutyl maleate; the fumaric esters, e.g., dimethyl fumarate, diethyl fumarate and dibutyl fumarate, and the itaconic esters, e.g., dimethyl itaconate, diethyl itaconate and dibutyl itaconate; the nitriles, e.g., acrylonitrile and methacrylonitrile and the halogen containing monomers, such as monochlorostyrene, dichlorostyrene, vinyl fluoride, vinyl chloride, vinylidene chloride and chloroprene. Also non-ionic monomers which form water-soluble homopolymers, e.g., acrylamide, methacrylamide, hydroxyethyl acrylate and hydroxyethyl methacrylate, may be mixed with a hydrophobic monomer in small amounts up to about 10 percent, based on the amount of hydrophobic monomer.

By the term "pH independent groups" as applied to ionic groups is meant that the groups are predominantly in ionized form over a wide range in pH, e.g., 2–12.

In carrying out the polymerization of the epoxide monomer with those embodiments in which it is desired not to have epoxide groups in the interior of the particle, the ratio of monomer to total polymer in the latex should be kept low at any given time during the process so as to avoid unduly swelling the existing latex particles. With too much swelling, i.e., too much monomer dissolved in the polymer, some polymerization may occur in the interior of the particle. With that occurrence, the epoxide groups are buried in the particle. The epoxide monomer is added to the starting latex over a short period or is added as a shot in one or more increments. Optionally, but preferably a hydrophobic monomer devoid of an epoxide group or a mixture of such monomers also is added, usually in admixture with the epoxide monomer. The polymerization is advantageously carried out at as low a temperature as will provide a practical polymerization rate in order to avoid hydrolyzing the epoxide monomer. Such temperatures range from about 0° to about 80° C, preferably from about 50° to about 70° C. The pH is kept in the range of from about 3 to about 8, preferably near 7. Unless the starting latex is prepared in situ, an initiator system (catalyst) is added to activate the latex particle surface, i.e., set up a steady state concentration of free-radicals. Continued addition of the initiator system after the addition of monomers can be carried out, if desired— especially when a redox system is used. The polymerization reaction is continued until the monomers are substantially completely polymerized.

The product obtained by the above-described method is a latex of which the colloidally dispersed polymer particles, having a particle size of from about 500 to about 10,000 Angstroms, consist of the starting latex particles encapsulated with a bound layer having a thickness of from a monomolecular layer of the polymer to about 100 Angstroms, the layer consisting of a functional polymer with epoxide groups on the outer surface thereof.

The amount of epoxide monomer polymerized in the encapsulating layer of the structured-particle latex ranges from about 0.01 to about 1.4 milliequivalents, preferably from about 0.04 to about 0.5 milliequivalent, per gram of total polymer in the latex. The proportion of epoxide monomer is inversely related to the particle-size of the latex being encapsulated and also is inversely related to the molecular cross-sectional area of the epoxide monomer. Thus, one would not use the minimum amount of epoxide monomer with a starting latex of the smallest particle size.

The initiators used in the polymerization of the epoxide monomers are of the type which produce free-radicals and conveniently are per-oxygen compounds, for example: the inorganic peroxides such as hydrogen peroxide; the organic hydroperoxides such as cumene hydroperoxide and t-butyl hydroperoxide; the organic peroxides such as benzoyl peroxide, acetyl peroxide, lauroyl peroxide, peracetic acid and perbenzoic acid — sometimes activated by water-soluble reducing agents such as a ferrous compound, sodium bisulfite or hydroxylamine hydrochloride and other free-radical producing such as 2,2′-azobisisobutyronitrile.

The organic hydroperoxides and 2,2′-azobisisobutyronitrile are preferred.

The surfactants which are used either in the starting latex or as additives for further stabilization of the latex products are cationic surfactants or non-ionic surfactants or mixtures thereof which do not react rapidly with the epoxide monomers.

The cationic surfactants include the classes of quaternary ammonium salts and hydrates, fatty amides derived from disubstituted diamines, fatty chain derivatives of pyridinium compounds, ethylene oxide condensation products of fatty amines, sulfonium compounds, isothiouronium compounds, and phosphonium compounds. Specific examples of the cationic surfactants are cetyl trimethyl ammonium bromide, cetyl pyridinium chloride, an ethanolated alkyl guanidine amine complex, stearyl dimethyl benzyl ammonium chloride, cetyl dimethyl benzyl ammonium chloride, tetradecylpyridinium bromide, diisobutyl phenoxy ethoxy ethyl dimethyl benzyl ammonium chloride, 1-(2-hydroxyethyl)-2-(mixed pentadecyl and heptadecyl)-2-imidazoline, resin amine ethoxylate, oleyl imidazoline, octadecylethylmethylsulfonium methyl sulfate, dodecylbis-β-hydroxyethylsulfonium acetate, dodecylbenzyldimethylsulfonium chloride, dodecylbenzyltrimethylphosphonium chloride, S-p-dodecylbenzyl-N,N,N′,N′-tetramethylisothiouronium chloride, and the like.

Typical non-ionic emulsifiers (surfactants) are compounds formed by the reaction of an alkylene oxide, such as ethylene oxide, propylene oxide, or butylene oxide with long chain fatty alcohols, long chain fatty acids, alkylated phenols, long chain alkyl mercaptans, long chain alkyl primary amines, for example, cetylamine; the alkylene oxides being reacted in a ratio of such as 5 to 20 moles or higher such as up to 50 moles per mole of the coreactant. Similarly effective compounds are monoesters such as the reaction products of a polyethylene glycol with a long chain fatty acid, for example, glycerol monostearate, sorbitan trioleate, and partial and complete esters of long chain carboxylic acids with polyglycol ethers of polyhydric alcohols. By "long chain" in the above description is meant an aliphatic group having from six carbon atoms to 20 or more.

The preferred surfactants are surfactants having pH independent cationic groups and especially preferred are the fugitive surfactants such as cationic surfactants in which the cationic group is sulfonium, sulfoxonium, isothiouronium or a reducible quaternary nitrogen group, e.g., pyridinium, isoquinolinium and quinolinium.

The latex according to the foregoing description, containing particles of the starting latex encapsulated with a relatively thin coating of a polymer of the epoxide monomer preferably as a copolymer with a hydrophobic, ethylenically unsaturated monomer, can then be reacted with (a) a low molecular weight, non-ionic, water-stable, nucleophilic sulfide, which can diffuse through an aqueous phase, and (b) a low molecular weight acid which ionizes at pH value below 10 to form particles of polymer having pH independent cationic groups, i.e., onium ions, chemically attached to the particle surface. Ordinarily, the particles are approximately spherical.

Alternatively, a latex of a copolymer having epoxide groups uniformly or randomly placed throughout the polymer particles comprising the latex may be reacted with a non-ionic nucleophile and an acid to prepare a cationic structured-particle latex, provided that compositions and conditions are chosen such that only the epoxide groups at or near the surface of the particle are reacted with the nucleophile. Since the rate of reaction of the epoxide groups at or near the surface of the particle in such copolymers is considerably faster than for epoxide groups in the interior of the particle, kinetic data will shown when the thin layer near the surface has reacted. With copolymers having higher amounts of epoxide monomer polymerized throughout the particle, swelling of the particle occurs as the nucleophile reacts, further reaction within the particle can occur rather readily, controlling the reaction to attain a structured-particle is difficult and the same advantageous results are not obtained.

In another embodiment, latexes containing other functional groups which can react in the dispersed state to form epoxide groups can be used as the starting latex. For example, carbon-to-carbon unsaturated groups may be oxidized such as with hydrogen peroxide of form chemically bound epoxide groups on the particle surface.

For each epoxide group which is reacted with a non-ionic nucleophile and an acid, one charge which is bound to the polymer is produced and one anion derived from the acid is released. In the reaction of a nucleophile with a structured-particle latex having epoxide groups chemically bound near the particle surface or with a latex having epoxide groups distributed throughout the latex particle, the amount of epoxide group reacted is such as to provide from about 0.01 to about 0.5 milliequivalent of charge per gram of polymer. Preferably, the range is from about 0.04 to about 0.35 milliequivalent of charge per gram of polymer. However, in the thin reacted layer near the surface of the particle, the amount of bound charge is from about 0.4 to about 2.5 milliequivalents for each gram of polymer in the layer.

The nucleophilic compounds which are operable in the practice of this invention are non-ionic, carbon-containing nucleophiles which are stable in and can diffuse through aqueous media.

The nucleophilic compounds which are used advantageously in the practice of this invention are represented by the sulfides having the formula:

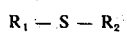

wherein $R_2$ and $R_2$ individually are lower alkyl or wherein $R_1$ and $R_2$ are combined as one alkylene radical having 3 to 5 carbon atoms.

In this specification the term lower alkyl means an alkyl having from 1 to 4 carbon atoms such as methyl, ethyl, propyl, isopropyl, n-butyl and isobutyl.

Representative specific nucleophilic compounds are hydroxyethylmethyl sulfide, hydroxyethylethyl sulfide, dimethyl sulfide, diethyl sulfide, di-n-propyl sulfide, methyl-n-propyl sulfide, methylbutyl sulfide, dibutyl sulfide, dihydroxyethyl sulfide, bis-hydroxybutyl sulfide, trimethylene sulfide, thiacyclohexane, and tetrahydrothiophene.

The acids which are useful in the practice of this invention are represented by the inorganic acids such as sulfuric acid and phosphoric acid; the lower aliphatic, saturated carboxylic acids such as formic acid, acetic acid, propionic acid and butyric acid; and other carboxylic acids such as lactic acid, malic acid, tartaric acid, citric acid benzoic acid, acrylic acid, and maleic acid. The lower aliphatic, saturated acids are preferred.

In carrying out the reaction between the nucleophilic compound and the particles of latex having epoxide groups chemically bound to the surface thereof, the latex is stirred gently while the nucleophilic compound and the acid are added thereto, as the compounds per se or in the form of a solution. The nucleophilic compound and the acid may be added in combination or sequentially. Usually, however, the nucleophilic compound is added first and the latex is stirred for a short period, then the acid is added either as a single shot or slowly over a period as long as several days. Gentle stirring may continue throughout the ensuring reaction, or optionally after dispersion of the compounds in the latex, the stirring may be discontinued. The reaction is conveniently carried out at ambient temperature although temperatures from about 0° to about 80° C can be used. The reaction occurs spontaneously. It is preferred to carry out the reaction until a predominant proportion of the colloidal stability of the product is provided by the resulting chemically bound cationic groups. When a desired degree of reaction is reached, any excess nucleophile and acid commonly are removed by standard methods, e.g., dialysis, vacuum stripping and steam distillation. It is preferred to remove the acid by dialysis or ion exchange before stripping off the nucleophile, especially by vacuum stripping at a temperature below about 40° C. Optimum results are obtained by dialysis.

Other cationic groups can be substituted for cationic groups which are chemically bound to the latex particles according to the foregoing description by carrying out a further reaction with such cationic groups. For example, a cationic structured-particle latex having sulfonium groups chemically bound to the structured-particles at or near the particle surface can be reacted with hydrogen peroxide at a temperature of from about 20° to about 80° C., preferably at ambient temperature, for a sufficient time to oxidize part or all of the sulfonium groups to sulfoxonium groups. Such treatment also reduces the odor of the latex. For best results in such an oxidation reaction, the hydrogen peroxide is used in excess, e.g., from 2 to 10 moles of hydrogen peroxide for each mole of sulfonium groups.

The cationic latexes of the present invention have considerably improved chemical and mechanical stability in comparison with the starting latexes. In many applications, however, such as in coating hydrophobic substrates, latexes stabilized only by charges chemically bound to the particle surface have too high surface tension to provide good wetting of the hydrophobic surface. In such instances the addition to the latex of small amounts, such as from about 0.01 to about 0.1 of conventional cationic or nonionic surfactant per gram of polymer, is advantageous. In still other applications, the presence of even small amounts of water soluble surface active agents is detrimental. The latexes of the present invention are highly advantageous for such applications. Since a sufficient amount of charge is chemically bonded to the particle surface to provide colloidal stability, exhaustive dialysis or ion exchange can be used to remove water-soluble material from the latex and substitute counter ions, if desired, while retaining cationic functionality and colloidal stability of the latex.

A simple test is suitable to screen the latexes for shear stability: a drop of latex is placed in the palm of the hand and rubbed back and forth with a finger. As the latex is sheared, it gradually dries out and forms a film. Unstable latexes coagulate before drying, usually after one to three rubs. Stable latexes can be rubbed more than five cycles before failure. Latexes which tolerate 20 rubs are very stable and can be rubbed to dryness before setting up.

The rub test correlates with a more sophisticated test in which a drop of latex is sheared in a cone and plate viscometer (Rotovisco rotational viscometer). A very stable latex according to the rub test can be sheared for greater than 15 minutes at 194 rpm without coagulation of the latex.

The following examples illustrate ways in which the present invention can be practiced, but should not be construed as limiting the invention. All parts and percentages are by weight unless otherwise expressly indicated. The particle sizes shown in the examples are average particle diameters obtained by light scattering measurements, except as indicated. In all of the emulsion polymerization reactions, the reactor is purged with nitrogen after addition of the components of the polymerization recipe.

EXAMPLE 1

An initial latex is prepared in a batch recipe by an emulsion polymerization reaction of 40 parts of styrene, 50 parts of butadiene and 10 parts of glycidyl methacrylate in 297 parts of water using 0.2 part of dodecanethiol, 2 parts of 2,2'-azobisisobutyronitrile, 1 part of dodecylbenzyldimethylsulfonium chloride and 0.2 part of 2,6-di-tert-butyl-4-methylphenol with stirring for 8 hours at 70° C. The product is a fluid latex having a solids content of 23.4 percent and a particle size of 1280 Angstroms. The latex has poor shear stability (less than 1 rub).

To a portion of the initial latex immediately after removal from the reactor is added with thorough mixing 0.045 gram of dimethyl sulfide per gram of solids in the latex (1.03 moles of dimethyl sulfide for each mole of epoxide). To the resulting mixture is added 0.0125 gram of acetic acid per gram of solids (0.21 mole of acid for each mole of epoxide) in the form of a 16 percent aqueous solution. After 11 days of reaction at ambient temperature (23°–28° C), the pH of the reaction mixture is raised to 7 with ammonium hydroxide. The resulting neutralized latex is dialyzed until essentially salt free. The dialyzed latex contains 18.6 percent solids and 0.061 milliequivalent of acetate ion per gram of solids.

The dialyzed latex is formulated with additional dodecylbenzyldimethylsulfonium acetate to a total of 0.138 milliequivalent per gram of polymer, then is concentrated to 42.4 percent solids and a pH of 8.

The resulting formulated latex is coated on cold rolled steel panels, phosphated steel panels and aluminum panels by two passes of a No. 16 wire-wound rod with drying in air between applications. The coated panels are then baked at 175°0 C for 20 minutes. The thickness of the coating on the cold rolled steel panel is 1.2 mils, on the phosphated steel panel is 0.95 mil and on the aluminum panel is about 1 mil.

The panels are tested for water resistance by boiling in water for ½ hour, drying, applying pressure sensitive tape (Scotch No. 600), then rapidly removing the tape. None of the coating is peeled off from any of the panels. A slight blush is noted on the coated cold rolled steel panels but there is no observable effect on the other panels.

EXAMPLE 2

An initial latex is prepared by an emulsion polymerization reaction of 38 parts of styrene, 50 parts of butadiene, 10 parts of glycidyl methacrylate and 2 parts of 2-hydroxyethyl acrylate in 219 parts of water using 0.1 part of dodecanethiol, 2 parts of 2,2-azobisisobutyronitrile, and 1 part of dodecylbenzyldimethylsulfonium chloride with stirring for 20 hours at 50° C and 2 hours at 70° C. The product is found to be a fluid latex having a solids content of 28.1 percent and a particle size of 1450 Angstroms. The latex has poor shear stability, i.e., less than one rub.

The initial latex is formulated with a sufficient amount of an aqueous solution of dodecylbenzyldimethylsulfonium chloride to bring the total to 0.06 milliequivalent per gram of solids and the solids of the latex are thereby reduced to 26.5 percent. Different portions of the latex are mixed with sulfide nucleophiles and acetic acid as shown in Table I. After the reactants had been allowed to stand for four days, the resulting latex products are rub stable. The product data in the Table are for the latexes after the reaction had been allowed to continue for a total of 8 days. The sulfonium ion content is determined by titration of the acetate ion.

Table I

| | Example No. | | |
|---|---|---|---|
| | 2A | 2B | 2C |
| Reactants | | | |
| Latex, parts | 1300 | 1300 | 1300 |
| Thiophane, parts | 21.2 | | |
| Dimethyl Sulfide, parts | | 15.0 | |
| 2-Hydroxyethylethyl Sulfide, parts | | | 25.5 |
| Acetic Acid, parts | 4.14 | 4.14 | 4.14 |
| Products | | | |
| Solids Content, percent | 25.6 | 25.7 | 25.2 |
| Bound Sulfonium ion, milliequivalents/gram of solids | 0.083 | 0.085 | 0.087 |

EXAMPLE 3

An initial latex is prepared by an emulsion polymerization reaction of a first monomer composition of 50 parts of methyl methacrylate and 45 parts of butyl acrylate in 300 parts of water using 0.2 part of dodecanethiol, 2 parts of 2,2-azobisisobutyronitrile and 4 parts of dodecylbenzyldimethylsulfonium chloride with stirring for 20 hours at 50° C and 1 hour at 70° C to provide a monomer conversion of about 90 percent, then 5 parts of glycidyl methacrylate is added and the same reaction conditions are maintained for an additional 2 hours. After the reactor is vented and cooled, the product is found to be a fluid latex having a solids content of 24.6 percent and a particle size of 1840 Angstroms. The latex has poor shear stability (less than 1 rub).

With a portion of the initial latex is mixed 1.76 milliequivalents of dimethyl sulfide and 0.53 milliequivalent of acetic acid for each gram of polymer in the latex portion and the resulting mixture is allowed to stand at 25° C for 2 days, then the product is dialyzed and vacuum stripped. The latex product is shear stable (greater than 20 rubs) and has a bound charge of 0.21 milliequivalent of sulfonium ion for each gram of polymer in the latex, a solids content of 37.4 percent and a pH of 8.0.

EXAMPLE 4

A latex is prepared by batch emulsion polymerization of 50 parts of methyl methacrylate, 45 parts of butyl acrylate and 5 parts of glycidyl methacrylate using 0.2 part of dodecanethiol as chain transfer agent, 2 parts of 2,2°-azobisisobutyronitrile as catalyst, 4 parts (active basis) of dodecylbenzyldimethylsulfonium chloride as emulsifier, 300 parts of water and a polymerization time of 16 hours at 50° C and 3 hours at 70° C. The resulting initial latex having a solids content of 24.2 percent, has poor shear stability and has an average particle diameter of 1730 Angstroms.

The initial latex is reacted with the same ingredients in the same proportions in the same way as described for Example 3 except that the reaction time is 13 days. The latex product has a bound charge of 0.10 milliequivalent of sulfonium ion for each gram of polymer in the latex, a solids content of 35.8 percent, a pH of 6.0 and very good shear stability (greater than 20 rubs).

EXAMPLE 5

A latex is prepared substantially as described in Example 4 except that the first monomer composition consists of 40 percent of methyl methacrylate, 45 percent of butyl acrylate, and 15 percent of glycidyl methacrylate and the reaction time at 50° C is 17 hours rather than 16. The resulting initial latex has poor shear stability, a solids content of 22.4 percent and a particle size of 1830 Angstroms.

The initial latex is reacted in the same manner with the same ingredients in the same proportions as in Example 3 except that the reaction time is 4 days. The latex product has a bound charge of 0.11 milliequivalent of sulfonium ion for each gram of polymer in the latex, a solids content of 36.3 percent, a pH of 8.0 and very good shear stability (greater than 20 rubs).

EXAMPLE 6

An initial latex is prepared in the same manner as described for Example 3 except that (a) the initial monomer composition is 33 parts of styrene, 52 parts of butadiene and 10 parts of butyl methacrylate, (b) the initial reaction at 50° C is for 16 hours and at 70° C is for 4 hours, (c) the reaction time after addition of the glycidyl methacrylate is 3 hours and (d) the amount of dodecylbenzyldimethylsulfonium chloride is 1 part. The resulting initial fluid latex has poor shear stability, a particle size of 1550 Angstroms and a solids content of 22.5 percent.

The initial latex is formulated with a 5:1 mole excess of dimethyl sulfide and a 1.5:1 mole excess of acetic acid and the ensuing reaction is allowed to continue for 6 days. The product has very good shear stability (greater than 20 rubs). After being dialyzed and vacuum stripped, the latex product has a solids content of 30.7 percent and a bound charge of 0.22 milliequivalent of sulfonium ion for each gram of polymer in the latex.

That which is claimed is:

1. A method for preparing a cationic structured-paticle latex comprising the steps of reacting at a temperature from about 0° to about 80° C a water-stable, nonionic, sulfide nucleophile which is capable of diffusing through aqueous media and a low molecular weight acid which ionizes at pH values below about 10 with a latex of copolymer particles having epoxide groups bound to the copolymer at or near the particle surface; said epoxide groups being present in an amount of at least about 0.01 milliequivalent per gram of copolymer in the latex; whereby sulfonium cationic groups are chemically bound to the particles at or near the particle surface.

2. The method of claim 1 in which the reaction is carried out until the sulfonium cationic groups are present in an amount from about 0.01 to about 0.5 milliequivalent per gram of copolymer.

3. The method of claim 1 in which the acid is a lower aliphatic carboxylic acid.

4. The method of claim 3 in which the acid is acetic acid.

5. The method of claim 1 in which the latex of copolymer particles having epoxide groups is a structured-particle latex of copolymer particles consisting of a nonionic, organic polymer core having adhered thereto a thin layer of a water-insoluble copolymer of (a) an ethylenically unsaturated, non-ionic monomer which is devoid of an epoxide group and (b) a nonionic, ethylenically unsaturated, epoxide monomer; the amount of the epoxide groups in the copolymer being from about 0.01 to about 1.4 milliequivalents per gram of copolymer.

6. The method of claim 1 in which the latex of copolymer particles having epoxide groups bound to the copolymer at or near the particle surface also has bound epoxide groups throughout the particles.

7. The method of claim 1 in which the epoxide groups are provided by copolymerized glycidyl methacrylate.

8. The method of claim 1 in which the sulfide nucleophile is a compound having the formula $R_1$—S—$R_2$ wherein $R_1$ and $R_2$ individually are lower alkyl, hydroxy lower alkyl or wherein $R_1$ and $R_2$ are combined as one alkylene radical having from 3 to 5 carbon atoms, whereby the chemically bound cationic groups are sulfonium groups.

9. The method of claim 8 in which the sulfide nucleophile is dimethyl sulfide, thiophane or 2-hydroxyethylethyl sulfide.

10. The method of claim 1 in which the latex of copolymer particles having epoxide groups bound to the copolymer at or near the polymer surface is prepared by emulsion polymerization.

* * * * *